Dec. 16, 1952   L. J. BERTELE   2,621,564
OPTICAL EYEPIECE, PARTICULARLY FOR WIDE ANGLES
Filed Sept. 7, 1950
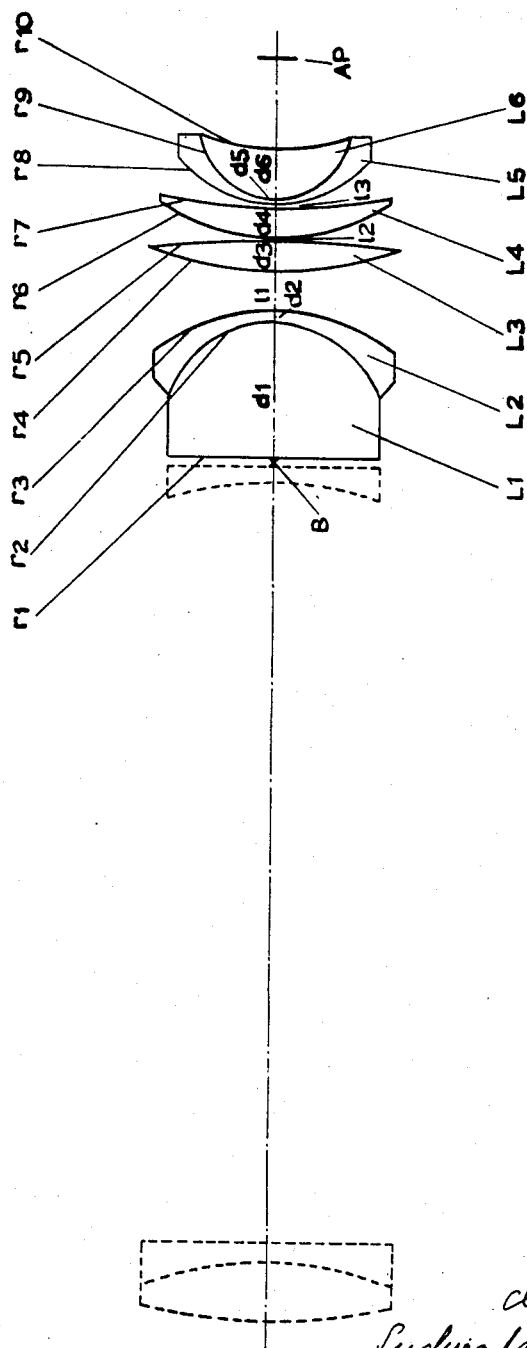
Inventor:
Ludwig Jakob Bertele,
By his attorneys;
Baldwin & Wight Patented Dec. 16, 1952

2,621,564

UNITED STATES PATENT OFFICE 2,621,564

OPTICAL EYEPIECE, PARTICULARLY FOR WIDE ANGLES

Ludwig Jakob Bertele, Heerbrugg, Switzerland

Application September 7, 1950, Serial No. 183,515
In Switzerland September 20, 1949

3 Claims. (Cl. 88—57)

The invention relates to eye-pieces of optical instruments for viewing real images produced by an objective. Throughout the description and claims the various data relating to the eye-piece will be counted from the objective towards the eye. A known type of eye-piece for this purpose is provided with at least four air-spaced components, in which the last component, that is the one next to the eye, is a meniscus convex towards the objective and the component towards the field diaphragm contains a highly curved cemented surface convex towards the eye and having a divergent effect. It is frequently necessary with eye-pieces of this kind to view marks such as scale graduations, figures and the like located in the focal plane of the objective simultaneously with the image produced by the objective. In this case the accuracy of reproduction of the marks may become unsatisfactory away from the centre of the image if aberrations of the eye-piece, especially coma, are compensated to too great an extent by corresponding aberrations in the objective.

In order to obtain a satisfactory view simultaneously of the marks and of what is in front of the objective, the objective as well as the eye-piece of the type considered must each for itself be capable of providing as satisfactory an image as possible. The object of the invention is to provide such an eye-piece, that is one satisfactorily imaging the marks at the focal plane of the objective, even over a wide angle of view.

According to the invention the last component (next to the eye) has a cemented surface concave towards the eye, of which the radius of curvature is less than 0.8 times the radius of curvature of the first surface of this component. The refractive index of the glass in front of the cemented surface is preferably at least 0.04 greater than that behind the cemented surface.

The accompanying drawing shows in conventional form an eye-piece in accordance with the invention and the three examples of which figures are hereinafter are in accordance with the drawing, the difference between the dimensions in the various examples being insufficient to make any perceptible difference to the figure.

In the figure:

L denotes the individual lenses
r, the radii of curvature of the lens surfaces
d, the lens thicknesses
l, the air spaces between the individual lenses
n, the refractive indices, and
v, the Abbé numbers.

The suffix denotes the order in which each of the above occurs from the objective towards the eye. AP is the exit pupil. The components of the objective are shown dotted.

The eye-pieces of all the examples consist of four components and six lenses $L_1$ to $L_6$. The first component (towards the objective) comprises two lenses $L_1$ and $L_2$ having between them a very highly curved cemented surface acting in a diverging manner, which is concave towards the objective. The real image plane B lies near the first surface, which is plane in these examples but is not necessarily so in every case. The second and third components are simple converging lenses $L_3$ and $L_4$, and the fourth component comprises two lenses $L_5$ and $L_6$ having between them a cemented surface highly convex towards the objective.

In the figure, the various elements of the eye-piece are shown in full lines. An indication of an objective is given in dotted lines to show how the eye-piece cooperates therewith.

In Example 1 the radius $r_9$ of the cemented surface in the fourth component is 0.586 times the radius of the convex outer surface $r_8$ and the difference between the refractive indices of the lenses $L_5$ and $L_6$ is 0.145. The focal length of the second component is 3.78f and the focal length of the third component is 3.61f where f is the focal length of the complete eye-piece.

In Example 2 the radius of the cemented surface $r_9$ is 0.638 times the radius of the convex outer surface $r_8$, and the difference between the refractive indices is 0.188. The focal length of the second component is 3.82f and the focal length of the third component is 3.45f, f being the focal length of the complete eye-piece.

In Example 3 the radius of the cemented surface $r_9$ is 0.531 times the radius of the convex outer surface $r_8$, and the difference between the refractive indices is 0.0965. The focal length of the second component is 3.81f and the focal length of the third component is 3.42f where f is the focal length of the complete eye-piece.

The data in the examples which follow relate to a focal length of 10 mm. The apparent field of view amounts to 77° and the entrance pupil lies 610 mm. in front of the real image plane.

*Example 1*

|     |                  |                | $n_d$  | $v$   |
|-----|------------------|----------------|--------|-------|
| $L_1$ | $r_1 = \infty$ |                |        |       |
|     | $r_2 = -87.64$   | $d_1 = 110.5$  | 1.5477 | 63.5  |
| $L_2$ | $r_3 = -155.26$ | $d_2 = 7.8$    | 1.6478 | 33.8  |
|     |                  | $l_1 = 29.5$   |        |       |
| $L_3$ | $r_4 = +299.87$ | $d_3 = 25.9$   | 1.6506 | 58.5  |
|     | $r_5 = -1330.1$ | $l_2 = 1.0$    |        |       |
| $L_4$ | $r_6 = +166.12$ | $d_4 = 23.8$   | 1.6506 | 58.5  |
|     | $r_7 = +536.36$ | $l_3 = 1.0$    |        |       |
| $L_5$ | $r_8 = +104.39$ | $d_5 = 3.6$    | 1.7484 | 27.8  |
| $L_6$ | $r_9 = +61.20$  | $d_6 = 40.3$   | 1.6031 | 60.7  |
|     | $r_{10} = +186.55$ |              |        |       |

*Example 2*

|     |                  |                | $n_d$   | $v$  |
|-----|------------------|----------------|---------|------|
| $L_1$ | $r_1 = \infty$ | $d_1 = 108.98$ | 1.52312 | 63.5 |
|     | $r_2 = -87.120$  |                |         |      |
| $L_2$ | $r_3 = -146.60$ | $d_2 = 8.8$    | 1.64781 | 33.8 |
|     |                  | $l_1 = 29.3$   |         |      |
| $L_3$ | $r_4 = +300.10$ | $d_3 = 25.7$   | 1.65062 | 58.5 |
|     | $r_5 = -1388.3$ | $l_2 = 1.0$    |         |      |
| $L_4$ | $r_6 = +164.4$  | $d_4 = 25.2$   | 1.65062 | 58.5 |
|     | $r_7 = +579.5$   | $l_3 = 1.0$    |         |      |
| $L_5$ | $r_8 = +93.92$  | $d_5 = 3.5$    | 1.74711 | 28.1 |
| $L_6$ | $r_9 = +59.94$  | $d_6 = 37.8$   | 1.55960 | 61.2 |
|     | $r_{10} = +160.8$ |               |         |      |

*Example 3*

|     |                  |                | $n_d$   | $v$  |
|-----|------------------|----------------|---------|------|
| $L_1$ | $r_1 = \infty$ | $d_1 = 108.7$  | 1.52312 | 63.5 |
|     | $r_2 = -87.00$   |                |         |      |
| $L_2$ | $r_3 = -146.40$ | $d_2 = 8.8$    | 1.64781 | 33.8 |
|     |                  | $l_1 = 30.8$   |         |      |
| $L_3$ | $r_4 = +299.70$ | $d_3 = 25.7$   | 1.65062 | 58.5 |
|     | $r_5 = -1386.30$ | $l_2 = 1.0$   |         |      |
| $L_4$ | $r_6 = +164.10$ | $d_4 = 25.2$   | 1.65062 | 58.5 |
|     | $r_7 = +587.30$  | $l_3 = 1.0$    |         |      |
| $L_5$ | $r_8 = +110.60$ | $d_5 = 3.5$    | 1.74711 | 28.1 |
| $L_6$ | $r_9 = +58.70$  | $d_6 = 40.3$   | 1.65062 | 58.5 |
|     | $r_{10} = +167.20$ |              |         |      |

By means of the invention, and particularly of the constructional forms set out in the examples, it is possible with a suitable construction of the objective to obtain in addition to a large image field of the outside view also a satisfactory image of the graduations and the like over a wide range of angle.

I claim:

1. An optical eye-piece for use with an image forming objective comprising, counting from the objective to the eye, a first component with a highly curved, cemented surface therein convex towards the eye, the lens on the convex side of said surface having a higher refractive index than the lens on the concave side thereof, a second component of converging power having an equivalent focal length greater than 2.0f and less than 7.0f where f is the focal length of the complete eye-piece, a third component of converging power having its less curved surface towards the eye and an equivalent focal length greater than 2.0f and less than 7.0f, and a fourth component having the form of a meniscus concave towards the eye and containing a cemented surface concave towards the eye, the radius of curvature of which surface is less than 0.8 and greater than 0.35 times the radius of curvature of the surface of said fourth component which is towards the objective, the refractive index of the lens on the convex side of the last mentioned cemented surface being greater than the refractive index of the lens on the concave side thereof, said components being axially separated by air spaces.

2. An optical eye-piece as defined in claim 1 in which the fourth component consists of a front negative lens and a rear positive lens and the axial thickness of the positive lens is at least 10 times the axial thickness of the negative lens.

3. An optical eye-piece as defined in claim 1 in which the air spaces between the second and third components and the third and fourth components are substantially equal.

LUDWIG JAKOB BERTELE.

REFERENCES CITED

The following references are of record in the file of this patent:

UNITED STATES PATENTS

| Number    | Name          | Date           |
|-----------|---------------|----------------|
| 1,468,762 | Taylor et al. | Sept. 25, 1923 |
| 1,478,704 | Erfle         | Dec. 25, 1923  |
| 2,267,832 | McCarthy      | Dec. 30, 1941  |
| 2,423,676 | Altman        | July 8, 1947   |

FOREIGN PATENTS

| Number  | Country       | Date          |
|---------|---------------|---------------|
| 461,062 | Germany       | June 13, 1928 |
| 409,465 | Great Britain | May 3, 1934   |
| 248,246 | Switzerland   | Feb. 16, 1948 |